(12) United States Patent
Nishi

(10) Patent No.: US 6,451,143 B2
(45) Date of Patent: Sep. 17, 2002

(54) METHOD FOR MANUFACTURING KEY PAD WITH RIGID RESIN KEY TOP

(75) Inventor: Kengo Nishi, Tokyo (JP)

(73) Assignee: Polymatech Co., Ltd. (JP)

( * ) Notice: Subject to any disclaimer, the term of this patent is extended or adjusted under 35 U.S.C. 154(b) by 0 days.

(21) Appl. No.: 09/923,889

(22) Filed: Aug. 7, 2001

Related U.S. Application Data

(63) Continuation of application No. 09/253,406, filed on Feb. 19, 1999.

(51) Int. Cl.[7] .............................................. B32B 31/12
(52) U.S. Cl. ................... 156/82; 156/272.6; 156/273.3; 156/275.7; 156/275.5; 156/325; 200/314; 200/341
(58) Field of Search .................... 156/272.2, 272.6, 156/275.5, 275.7, 274.4, 274.6, 274.8, 325, 273.3, 82; 200/308, 310–314, 317, 341; 427/508, 533, 535, 558, 553, 569, 570, 574; 264/446, 483, 448

(56) References Cited

U.S. PATENT DOCUMENTS

| | | | | |
|---|---|---|---|---|
| 5,234,744 A | * | 8/1993 | Yoshio | 200/310 |
| 5,439,545 A | * | 8/1995 | Nakanishi et al. | 156/273.3 |
| 5,922,161 A | * | 7/1999 | Wu et al. | 156/272.6 |
| 6,106,949 A | * | 8/2000 | Kataoka et al. | 427/535 |
| 6,196,738 B1 | * | 3/2001 | Shimizu et al. | 200/314 |

* cited by examiner

Primary Examiner—Michael W. Ball
Assistant Examiner—Jessica Rossi
(74) Attorney, Agent, or Firm—McGlew and Tuttle, P.C.

(57) ABSTRACT

A method for manufacturing a highly productive key pad with rigid resin key top, wherein the key top adhesion surface 2, 6 of the key pad 1, 5 or a portion thereof is surface altered by at least one method selected from short wavelength UV irradiation treatment, corona discharge treatment, flame treatment and plasma treatment and can be adhered with reactive hardening resin 3, 7 such as urethane base resin, epoxy base resin, amino base resin, acrylic base resin, cyanoacrylate base resin and photo reactive hardening resin, thereby reducing adhesion operation time, without fear of dislocation during the adhesion.

8 Claims, 3 Drawing Sheets

METHOD FOR MANUFACTURING KEY PAD WITH RIGID RESIN KEY TOP

RELATED APPLICATION

This is a continuation of application Ser. No. 09/253,406 filed on Feb. 19, 1999, and the entire disclosure of this prior application is considered to be part of the disclosure of the accompanying application and is hereby incorporated by reference therein.

FIELD OF THE INVENTION

The present invention relates to a method for manufacturing a beautiful and quality key pad assuring good durability to be used for a portable phone; portable information terminal, remote control of various home electric apparatuses, card remote control or various keyboards.

BACKGROUND OF THE INVENTION

Silicon rubber or the like are primarily used for the conventional key pad, because of their excellent low temperature resistance, heat resistance, precise formability and electric insulation. As key top, soft rubber is used for disposing graphics composed of character, numeral, symbol or picture on its surface or a light masking portion is arranged to dispose graphics formed by cutting out a character, numeral, symbol or picture.

However, as silicone base coating is used, in every case, as material of graphics to be formed on theses surfaces, they are worn or broken by finger pressure or friction with clothing resulting in the deterioration of 20 visual recognition or appearance.

Therefore, Japanese Utility Model Laid-Open Shouwa 48-15161, Japanese Patent 2627692 or Japanese Patent Publication Heisei 7-95411 have proposed methods wherein a key top part is formed separately with rigid resin for printing its surface or back or elsewhere and then integrated by engaging with a silicone key pad or adhering with adhesive or double side adhesive tape or the like.

Concerning the addition of different material to silicone rubber, it is also known to treat the surface as described in Japanese Patent Publication Heisei 7-282687 or Japanese Patent Publication Heisei 7-296676.

It should be noted that they are all concerned with the formation of a coating layer and not the adhesion of rigid resin key top with silicone key pad.

SUMMARY AND OBJECTS OF THE INVENTION

As silicone rubber is less adhesive, generally silicone base adhesives have been used or the surface was treated with a substrate for adhering them and there was no other solution. However, as these silicone base adhesives have weak retention force and exfoliate easily after adhesion, it has been often necessary to dispose an additional anti-detachment collar or the like on the key top part to be used in practice.

Moreover, as silicone base adhesives are slow in hardening, it is necessary to heat to 100° C. or more. As a consequence, it was difficult to use resins of low softening point represented by ABS as key to material.

What is more, as silicone rubber presents a high linear dilatation coefficient of 2 to $3 \times 10^{-4}$/° C., heating expands the key top part enormously and key pitch or the like vary; consequently it has been necessary to fix the key top part and the base key pad portion until the adhesion completion, increasing the time of adhesion process and the number of affixing jigs, and resulting in low productivity and less economy.

The present Invention concerns a method for manufacturing a key pad with rigid resin key top, solving these problems.

It concerns a method for manufacturing a high productivity key pad, comprising the steps for surface-modifying the adhesion surface of a key pad key top or a portion thereof by at least one method selected from the group including short wavelength ultraviolet irradiation treatment, corona discharge treatment, flame treatment and plasma treatment and adhering the key top molded with rigid resin with reactive hardening resin such as urethane base resin, epoxy base resin, amino base resin, cyanoacrylate base resin, photo reactive hardening resin or the like, thereby assuring more hard adhesion between the silicone rubber key pad and the key top, characterized by that low softening point rigid resins represented by ABS may also be used and that the adhesion operation can be completed more rapidly, without dislocation during the adhesion.

Namely, the present Invention concerns a method for manufacturing a key pad with rigid resin key top, comprising steps for surface-modifying the adhesion surface of a silicone rubber key pad for push-button, applying reactive hardening resin and, thereafter, adhering the key top molded with rigid resin.

Members composing a key pad are preferably made of silicone rubber, because of its excellent low temperature resistance, heat resistance, weather resistance, precise formability and electric insulation. Graphics composed of character, number, symbol or picture may be disposed on its surface or light masking may be arranged to dispose graphics formed by cutting out a character, number, symbol or picture.

Silicone rubber, key top member is weakly adhesive, however, the rigid resin key top is so made to be attached firmly with photo reactive hardening resin, by surface treating using at least one method selected from the group including short wavelength ultraviolet irradiation treatment, corona discharge treatment, flame treatment, plasma treatment or substrate treatment.

The short wavelength ultraviolet irradiation treatment used for the Invention consists in irradiating the key pad surface with short wavelength ultraviolet irradiation at a constant illumination, by a constant total light quantity to alter the surface. To be more precise, 184.9 nm and 253.7 nm radiation irradiated from a mercury lamp wherein mercury in contained under the pressure of about $10^{-1}$ mmHg generates ozone under the presence of oxygen, the ozone oxidizes the surface of an object to be treated, generates active groups such as carboxyl group or silanol group and, thereby, improving the adhesion and compatibility of printing inks or paintings.

Corona discharge treatment consists in applying a high tension between electrodes in the atmosphere to provoke dielectric breakdown and discharge, and introducing an object to be treated there-between, thereby oxidizing polymer of the surface layer and introducing active group into the surface to bring out the similar effect.

Flame treatment consists in passing an object to be treated through a strong oxidizing flame to bring out an effect similar to the corona treatment.

Plasma treatment consists in ionizing gas molecular by provoking glow discharge in low pressure inactive gas, oxygen, halogen gas or the like, generating plasma and activating the surface using its chemical activity.

Being dry process, short wavelength ultraviolet irradiation treatment, corona discharge treatment, flame treatment or plasma treatment are simpler in terms of process than the method using surface treatment agent; however, short wavelength ultraviolet irradiation treatment or corona treatment are preferable, because plasma treatment requires vacuum status or expensive equipment and flame treatment is necessarily dangerous.

To obtain a higher holding power, additional surface treatment may also be executed, after this surface-modification, using well-known silane, titanium or aluminum base various coupling agents.

The composition of the reactive hardening resin is not limited to at least one resin selected from the group including urethane base resin, epoxy base resin, amino base resin, acrylic resin and cyanoacrylate base resin.

The color is not particularly limited; however, if the key top part is to be illuminated, the reactive hardening resin should be translucent.

The hardening method of the reactive hardening resin is not particularly limited, but the use of heat reactive hardening resin or photo reactive hardening resin can reduce the adhesion process. As for heat reactive hardening resin allowing to reduce the adhesion time and increase the holding power, urethane base resin or cyanoacrylate base resin are preferable and, particularly, cyanoacrylate base resin would permit to obtain the adhesion within several seconds and reduce the manufacturing time. Photo reactive hardening resin also allows to obtain the adhesion within several seconds and reduce further the adhesion process, and moreover, assures a good stability during application work or conservation and a good workability. On the other hand, as visible ray reactive hardening resin would react even to an ordinary work light, UV hardening type resin is preferable in terms of workability.

If photo reactive hardening resin is used as reactive hardening resin and light is irradiated from the keypad side, at least members of the key pad member where photo reactive hardening resin is applied should be composed of semi-translucent or translucent member allowing to pass the light having the wavelength in the range of 200 to 600 nm where the applied photo reactive hardening resin hardens.

If light is irradiated from the key top side, members of at least the portion, among the rigid resin key top members, where photo reactive hardening resin is applied should be at least composed of semi-translucent or translucent member allowing to pass the light having the wavelength in the range of 200 to 600 nm where the applied photo reactive hardening resin hardens.

The rigid resin key top used for the Invention is a molded resin key top or a ground resin key top. The molded resin key top can be manufactured by using a mould of desired key top configuration, charging heat melt resin or liquid non hardened resin into the resin and hardening it by injection molding, compression molding, transfer molding or rotation molding.

Composition, kind, elasticity, color of the rigid resin key top are not particularly limited, but as indication, polycarbonate resin, polymethyl methacrylate resin, styrene base resin, acrylic base co-polymerized resin, polyolefine base resin, ABS resin, polyester base resin, epoxy base resin, polyurethane base resin, polyamide resin, silicone base resin or the like are included.

Graphics composed of character, number, symbol or picture may be disposed on the surface or back of the rigid resin key top, or light masking may be arranged to dispose graphics formed by cutting out a character, number, symbol or picture. Moreover, coating layer may be prepared over these graphics.

The form of the rigid resin key top adhesion portion may not be flat and may have irregularities arranged for positioning with the object to be adhesived.

If the key top is to be illuminated, graphics disposed on the back of the resin key top is to be configured to be recognized through the rigid resin key top or, moreover, these graphics are to be illuminated, the rigid resin key top color should be semi-translucent or translucent.

If translucent resin is used as reactive hardening resin and at least a part of the rigid resin key top member is made of translucent member, it can naturally be composed to allow to recognize through them characters, numerals, symbols, pictures or the like realized on the key pad surface, graphics made by disposing light masking portion and cutting out characters, numerals, symbols, pictures or the like, the color or the others.

For applying the reactive hardening resin, in addition to screen printing method, dispenser method, potting method, pad printing method, spray method or transfer method may also be used without particular specification.

To position the rigid resin key top for adhesion, irregularities for fitting may be disposed on either or both of the key pad and rigid resin key top, or a jig may be used to embrace the key pad and the rigid resin key top from outside.

If cyanoacrylate base resin is used as reactive hardening resin, the key pad and the rigid resin key pad are adhered by compression, heating and humidification. Photo reactive hardening resin can be adhered by light irradiation. The other adhesives are adhered by various other hardening conditions. As photo reactive hardening resin and cyanoacrylate base resin harden rapidly at a low temperature, it is unnecessary to heat the key pad composed of silicone rubber and dislocation would not be provoked by heat dilatation. As the consequence, it is enough to position the rigid resin key top at the adhesion, dispensing with fixing both rigid resin key top and key pad.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Now the Invention will be described more concretely referring to examples and comparative examples, but it should be noted that the Invention is not limited to them.

EXAMPLE 1

Figure 1:
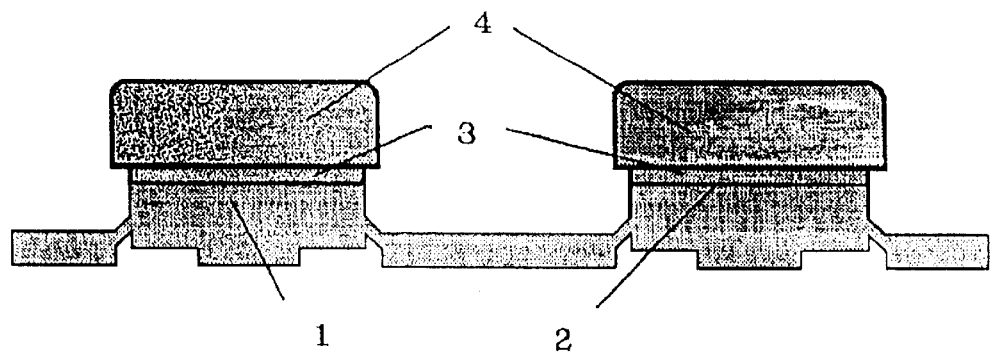
FIG. 1 is a vertical cross-portion showing the composition of the example 1.

As shown in FIG. 1, short wavelength UV is applied to the surface of a key pad 1 formed with silicone rubber compound (SH861 supplied by 20 TORAY-Dow Corning Silicone Co., Ltd.) to alter its surface. Cyanoacrylate base reactive hardening resin (1787 supplied by Three Bond Co., Ltd.) 3 is applied to a key top adhesion portion 2 of the key pad 1 by the dispenser, and a rigid resin key top 4 molded with ABS resin (Diapet ABS VP-1, supplied by Mitsubishi Rayon Col., Ltd.) is applied to the key top adhesion portion, and compressed for 10 seconds for adhesion.

EXAMPLE 2

Figure 2:
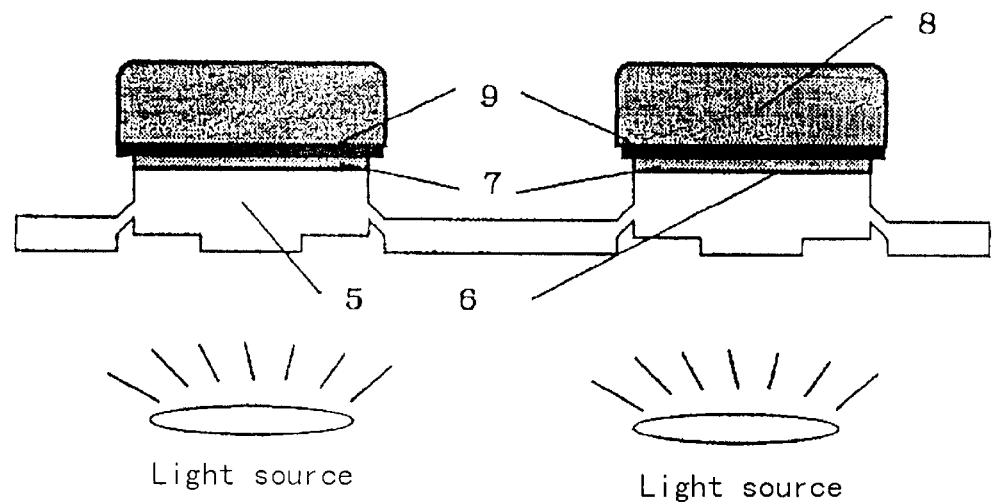
FIG. 2 is a vertical cross-portion showing the composition of the example 2.

As shown in FIG. 2, the surface of a key pad 5 formed with silicone rubber compound (SH861 supplied by TORAY-Dow Corning Silicone Co., Ltd.) is altered by corona treatment. UV reactive hardening resin (3045 supplied by Three Bond Co., Ltd.) 7 is applied to a key top adhesion portion 6 of the key pad 5 by screen printing method. Graphic printing 9 is made with printing ink (Sericol 13 supplied by Teikoku Ink Co., Ltd.) on the back of a rigid resin key top 8 formed with translucent polycarbonate resin (Panlite L1 225L supplied by Teijin Kasei Co., Ltd.), then this rigid resin key top 8 and the key top adhesion portion 6 are adhered, and UV having main wavelength 365 nm is irradiated from the key pad side by the intensity of 1000 mW/cm2 for 15 seconds to adhere them.

EXAMPLE 3

Figure 3:
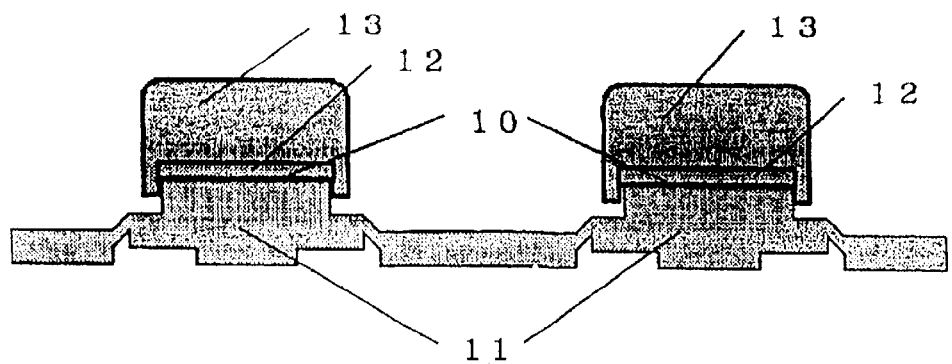
FIG. 3 shows the arrangement of the example 3.

As shown in FIG. 3, the surface of a key pad 11 formed using silicone rubber compound (SH861 supplied by TORAY-Dow Corning Silicone Co., Ltd.) and disposing irregularities for positioning on a key top adhesion portion 10 is irradiated by short wavelength UV to alter its surface. Towliquid type urethane base reactive hardening resin (7550 supplied by Lord Far East Incorporated) 12 is applied to the key top adhesion portion 10 of this key pad by the dispenser, and a rigid resin key top 13 molded with ABS resin (Diapet ABS VP-1, supplied by Mitsubishi Rayon Col., Ltd.) is fitted to the irregularities disposed on the key top adhesion portion 10, and hardened for 10 minutes at 80° C. for adhesion.

EXAMPLE 4

Figure 4:
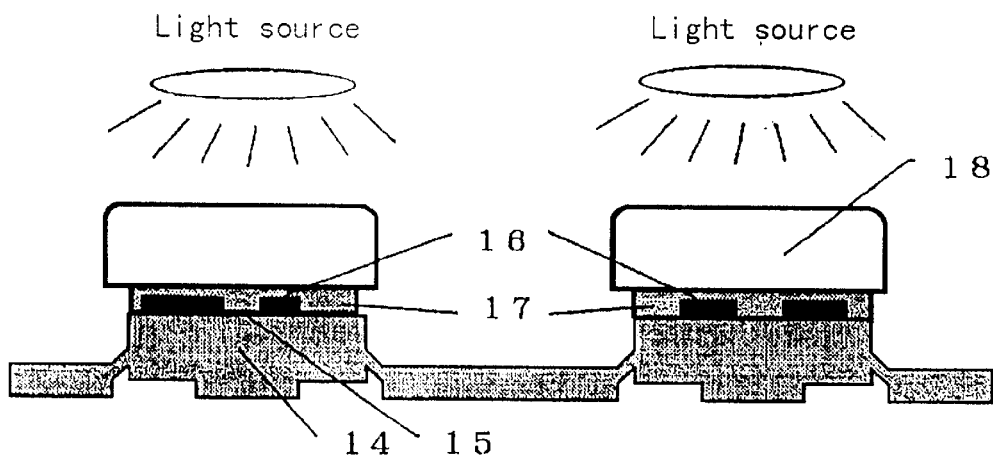
FIG. 4 shows the arrangement of the example 4.

As shown in FIG. 4, Graphic printing 16 is made with silicone ink (PRK-3 supplied by TORAY-Dow Corning Silicone Co., Ltd.) on a key top adhesion portion 15 of a key pad 5 formed with silicone rubber compound (SH861 supplied by TORAY-Dow Corning Silicone Co., Ltd.). The surface of this key pad is irradiated by short wavelength UV to alter. UV reactive hardening resin (3045 supplied by Three Bond Co., Ltd.) 17 is applied to a key top 15 by screen printing method. A rigid resin key top 18 formed with translucent acrylic resin (Acrylite L supplied by Mitsubishi Rayon Co., Ltd.) is adhered to the key top adhesion portion 15 by irradiating UV having main wavelength 365 nm from the key top side by the intensity of 1000 mW/cm² for 15 seconds.

COMPARATIVE EXAMPLE 1

Figure 5:
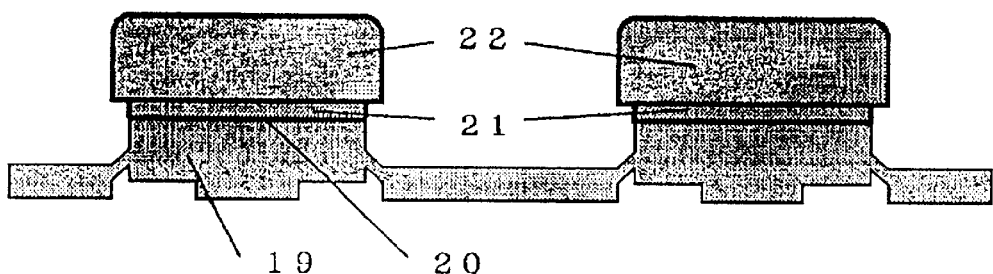
FIG. 5 shows the arrangement of the comparative example 1.

As shown in FIG. 5, silicone base reactive resin (TSE392, supplied by Toshiba Silicone CO., Ltd.) 21 is applied to a key top adhesion portion 20 of a key pad 19 formed using silicone rubber compound (SH861 supplied by TORAY-Dow Corning Silicone Co., Ltd.) by screen printing method. A rigid resin key top 22 molded with ABS resin (Diapet ABS VP-1, supplied by Mitsubishi Rayon Col., Ltd.) is applied to the key top adhesion portion 20 by fixing the key pad portion and the key pad portion using a dislocation prevention jig, and held for 72 hours at 25° C. for adhesion.

COMPARATIVE EXAMPLE 2

Figure 6:
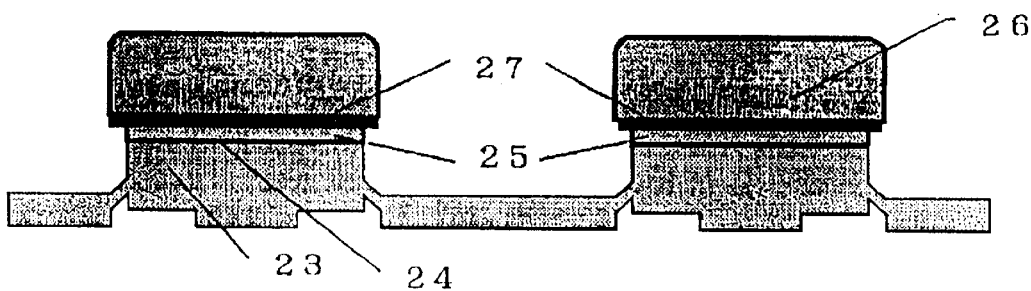
FIG. 6 shows the arrangement of the comparative example 2.

As shown in FIG. 6, silicone base reactive resin (TSE3221, supplied by Toshiba Silicone CO., Ltd.) 25 is applied to a key top adhesion portion 24 of a key pad 23 formed using silicone rubber compound (SH861 supplied by TORAY-Dow Corning Silicone Co., Ltd.) by screen printing method. Printing 27 is made with ink for polycarbonate (Sericol 13 supplied by Teikoku Ink Co., Ltd.) on the back of a rigid resin key top 26 formed with translucent polycarbonate resin (Panlite L1 225L supplied by Teijin Kasei Co., Ltd.), then this rigid resin key top 26 and the key top adhesion portion 24 are adhered, by fixing the key pad portion and the key pad portion using a dislocation prevention jig, and heated for 1 hour at 120° C. for adhesion.

COMPARATIVE EXAMPLE 3

Figure 7:
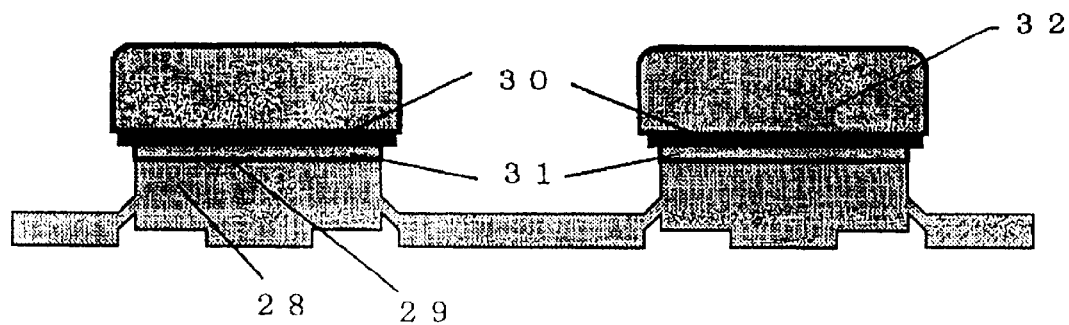
FIG. 7 shows the arrangement of the comparative example 3.

As shown in FIG. 7, cyanoacrylate base reactive hardening resin (1787, supplied by Three Bond Co., Ltd.) 30 is applied to a key top adhesion portion 29 of a key pad 28 formed using silicone rubber compound (SH861 supplied by TORAY-Dow Corning Silicone Co., Ltd.) by the dispenser. Printing 32 is made with ink for polycarbonate (Sericol 13 supplied by Teikoku Ink Co., Ltd.) on the back of a rigid resin key top 31 formed with translucent polycarbonate resin (Panlite L1 225L supplied by Teijin Kasei Co., Ltd.), then this rigid resin key top 31 is adhered to the key top adhesion portion 29, by compressing for 10 seconds.

COMPARATIVE EXAMPLE 4

Figure 8:
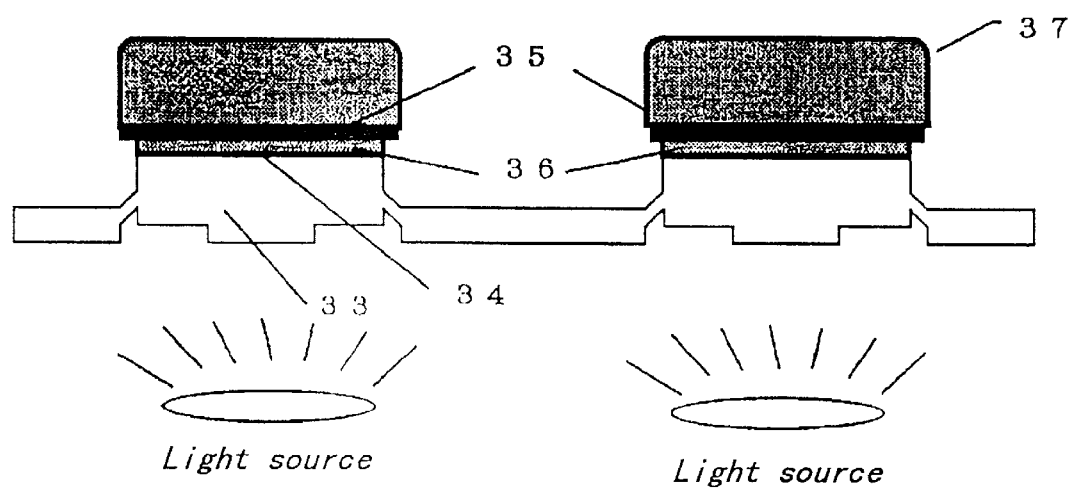
FIG. 8 shows the arrangement of the comparative example 4.

As shown in FIG. 8, UV reactive hardening resin (3045, supplied by Three Bond Co., Ltd.) 35 is applied to a key top adhesion portion 34 of a key pad 33 formed using silicone rubber compound (SH861 supplied by TORAY-Dow Corning Silicone Co., Ltd.) by screen printing method. Printing 37 is made with ink for polycarbonate (Sericol 13 supplied by Teikoku Ink Co., Ltd.) on the back of a rigid resin key top 36 formed with translucent polycarbonate resin (Panlite L1 225L supplied by Teijin Kasei Co., Ltd.), then this rigid resin key top 36 is adhered to the key top adhesion portion 34, by irradiating UV having main wavelength 365 nm from the key pad side by the intensity of 1000 mW/cm2 for 15 seconds.

In every one of key pads with rigid resin key top shown in examples 1, 2, 3 and 4, the rigid resin key top and the key pad are firmly adhered and, moreover, the adhesion process can be shortened all the way improving the dimensional precision and appearance.

Though including the heating process, the example 3 dispenses with the use of a dislocation prevention jig, as the key pad and the rigid resin key top are fitted by their irregularities.

On the other hand, low heat resistant rigid resin key top such as ABS could also be used.

On the contrary, in the conventional key pad as shown in the comparative example 1, as the rigid resin key top is made of ABS resin, it was necessary to use low temperature hardening silicone adhesive, resulting in longer hardening time.

The key pad shown in the comparative example 2 also takes long for hardening compared to the key pad shown in the examples 1 to 4.

Moreover, in the key pad shown in the comparative example 2, it was necessary to fix together the key pad and the rigid resin key top by a jig until their hardening and integration, in order to hold the key pad heat dilatation due to the heating. What is more, it takes long for hardening and requires a number of jigs, resulting in low productivity.

In the comparative examples 3 and 4, the rigid resin key top was not adhered sufficiently.

As described before, according to the method for manufacturing a key pad with rigid resin key top of the present Invention, the key pad surface made of silicone rubber can be altered by at least one method selected from the group including short wavelength ultraviolet irradiation treatment, corona discharge treatment, flame treatment and plasma treatment and the key top molded with rigid resin is adhered with reactive hardening resin, thereby assuring more hard adhesion between the silicone rubber key pad and the key top. As the consequence, low softening point rigid resins, for instance ABS resin (Diapet ABS VP-1, supplied by Mitsubishi Rayon Col., Ltd., softening point at 89° C.) may also be used, without fear of dislocation during the adhesion and without requiring a number of position fixing jigs, resulting, advantageously, in a high productive key pad.

While specific embodiments of the invention have been shown and described in detail to illustrate the application of the principles of the invention, it will be understood that the invention may be embodied otherwise without departing from such principles.

What is claimed is:

1. A method for forming a key, the method comprising the steps of:
   providing a key pad base of silicone rubber with an adhesion interface;
   surface modifying the adhesion interface of the key pad base by flame treatment;
   applying a urethane base reactive hardening resin on the surface modified adhesion interface;
   providing a key top molded with rigid resin; and
   adhering the key top to the reactive hardening resin.

2. A method for forming a key, the method comprising the steps of:
   providing a key pad base of silicone rubber with an adhesion interface;
   surface modifying the adhesion interface of the key pad base by flame treatment;
   applying an amino base reactive hardening resin on the surface modified adhesion interface;
   providing a key top molded with rigid resin; and
   adhering the key top to the reactive hardening resin.

3. A method for forming a key, the method comprising the steps of:
   providing a key pad base of silicone rubber with an adhesion interface;
   surface modifying the adhesion interface of the key pad base by flame treatment;
   applying a cyanoacrylate base reactive hardening resin on the surface modified adhesion interface;
   providing a key top molded with rigid resin; and
   adhering the key top to the reactive hardening resin.

4. A method for forming a key, the method comprising the steps of:
   providing a key pad base of silicone rubber with an adhesion interface;
   surface modifying the adhesion interface of the key pad base by corona discharge treatment;
   applying a urethane base reactive hardening resin on the surface modified adhesion interface;
   providing a key top molded with rigid resin; and
   adhering the key top to the reactive hardening resin.

5. A method for forming a key, the method comprising the steps of:
   providing a key pad base of silicone rubber with an adhesion interface;
   surface modifying the adhesion interface of the key pad base by corona discharge treatment;
   applying an amino base reactive hardening resin on the surface modified adhesion interface;
   providing a key top molded with rigid resin; and
   adhering the key top to the reactive hardening resin.

6. A method for forming a key, the method comprising the steps of:
   providing a key pad base of silicone rubber with an adhesion interface;
   surface modifying the adhesion interface of the key pad base by corona discharge treatment;
   applying a cyanoacrylate base reactive hardening resin on the surface modified adhesion interface; and
   providing a key top molded with rigid resin; adhering the key top to the reactive hardening resin.

7. A method for forming a key, the method comprising the steps of:
   providing a key pad base of silicone rubber with an adhesion interface;
   surface modifying the adhesion interface of the key pad base by flame treatment;
   applying a acrylic base reactive hardening resin on the surface modified adhesion interface;
   providing a key top molded with rigid resin; and
   adhering the key top to the reactive hardening resin.

8. A method for forming a key, the method comprising the steps of:
   providing a key pad base of silicone rubber with an adhesion interface;
   surface modifying the adhesion interface of the key pad base by corona discharge treatment;
   applying a acrylic base reactive hardening resin on the surface modified adhesion interface;
   providing a key top molded with rigid resin; and
   adhering the key top to the reactive hardening resin.

* * * * *